United States Patent
Buswell

(10) Patent No.: US 8,918,582 B2
(45) Date of Patent: Dec. 23, 2014

(54) SIMULATING EEPROM IN VIRTUAL DISTRIBUTED SWITCHES

(75) Inventor: John I. Buswell, Athens, OH (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/610,548

(22) Filed: Sep. 11, 2012

(65) Prior Publication Data

US 2014/0075092 A1 Mar. 13, 2014

(51) Int. Cl.
- G06F 12/00 (2006.01)
- G06F 12/02 (2006.01)
- G06F 12/14 (2006.01)

(52) U.S. Cl.
CPC ........ G06F 12/0246 (2013.01); *G06F 12/0238* (2013.01); *G06F 12/1433* (2013.01)
USPC ........... 711/103; 711/104; 711/144; 711/153; 711/203

(58) Field of Classification Search
CPC ............ G06F 12/0246; G06F 12/0638; G06F 13/1694
See application file for complete search history.

(56) References Cited

U.S. PATENT DOCUMENTS

| | | | |
|---|---|---|---|
| 6,167,338 A | 12/2000 | De Wille et al. | |
| 7,257,811 B2 | 8/2007 | Hunt et al. | |
| 7,451,303 B2 | 11/2008 | Biondi et al. | |
| 7,523,139 B1 | 4/2009 | Kemkar | |
| 7,761,283 B1 | 7/2010 | Curtis et al. | |
| 7,840,723 B1 | 11/2010 | Kemkar | |
| 7,937,518 B2 | 5/2011 | Boyd et al. | |
| 2006/0160626 A1* | 7/2006 | Gatto et al. | 463/43 |
| 2009/0106487 A1* | 4/2009 | Kruecken | 711/103 |
| 2009/0292858 A1 | 11/2009 | Lambeth et al. | |
| 2010/0165876 A1 | 7/2010 | Shula et al. | |
| 2012/0017031 A1 | 1/2012 | Mashtizadeh et al. | |
| 2012/0110248 A1* | 5/2012 | Deng et al. | 711/103 |

FOREIGN PATENT DOCUMENTS

JP  2000330970  11/2000

OTHER PUBLICATIONS

Clark, C. et al., "Live migration of virtual machines," NSDI'05 Proceedings of the 2nd conference on Symposium on Networked Systems Design & Implementation, 2005, vol. 2, USENIX Association Berkeley, CA.

* cited by examiner

*Primary Examiner* — Aimee Li
*Assistant Examiner* — Arvind Talukdar
(74) *Attorney, Agent, or Firm* — Shimokaji & Assoc., P.C.

(57) ABSTRACT

A virtual EEPROM driver is simulated for a virtual switch. A write function may be written to a shared memory device and designated as a virtual EEPROM driver. The virtual EEPROM driver may be duplicated into a non-volatile memory providing availability during a boot process.

7 Claims, 3 Drawing Sheets

SIMULATING EEPROM IN VIRTUAL DISTRIBUTED SWITCHES

BACKGROUND

The present invention relates to network switches, and more specifically, to simulating an EEPROM in virtual distributed switches.

Typically EEPROM devices on physical switches may be used for storing configuration information and other critical data that must survive a reboot. Typically EEPROM data is stored directly as a data structure, which may be loaded and unloaded as needed from EEPROM into memory. On a physical switch, firmware in two different image slots, for example, image1 and image2 slots may be independent of each other even though they share a command data storage location for configuration. Thus data for image1 may not be available for the image2 slot.

When porting network operating systems designed for physical switches over to virtual distributed switch environments, an EEPROM device may not be available since the EEPROM is a physical device while the virtual switch is software. Current known solutions may involve modifying the network operating system to write the EEPROM data out to a file. This may require significant modification to the existing network operating system code as well as significant testing and debugging. EEPROM data are usually designed to be stored outside of regular system storage. Configuration file solutions may place the EEPROM data and the configuration in the same place, leading to potential corruption.

SUMMARY

According to one embodiment of the present invention, a virtual switch architecture comprises a memory module; a virtual EEPROM driver in the memory module; and a processor configured to write an EEPROM write function to the virtual EEPROM driver in the memory module.

According to another embodiment of the present invention, a host machine comprises data storage; a memory module connected to the data storage; and a processor connected to the memory and the data storage, wherein the processor is configured to: read an EEPROM write function from an in-memory data structure, write the EEPROM write function to a shared memory area in the memory module, and designate the EEPROM write function as a virtual EEPROM driver.

According to still yet another embodiment of the present invention, a computer program product for simulating an EEPROM in a virtual switch, the computer program product comprising a computer readable storage medium having computer readable program code embodied therewith, the computer readable program code being configured to: read an in-memory data structure; write an EEPROM write function to a shared memory device file in a memory module; and designate the written EEPROM write function as a virtual EEPROM driver in the memory module.

DETAILED DESCRIPTION

Figure 1:
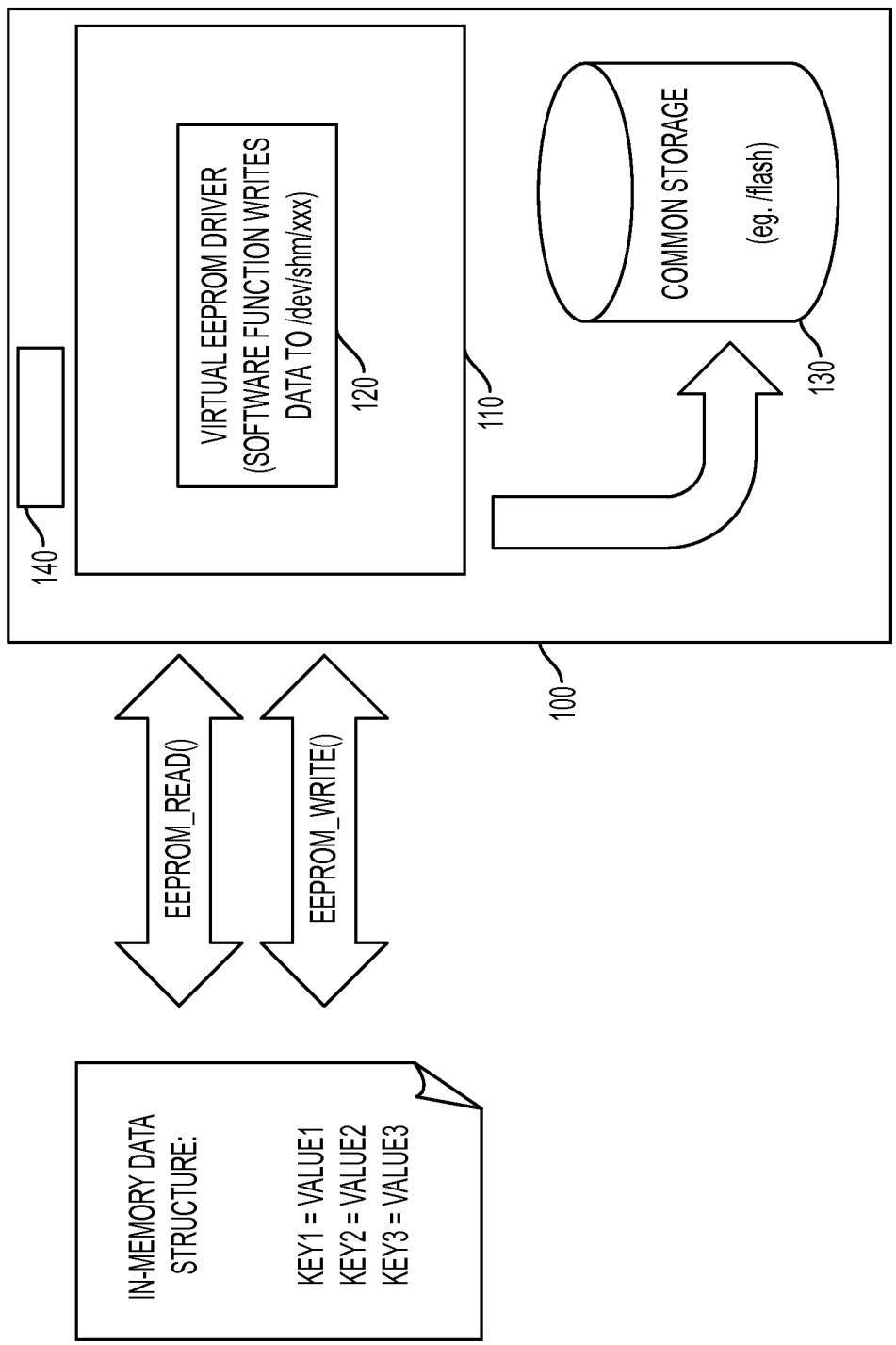
FIG. 1 is a block diagram of a virtual switch architecture in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, virtual switch architecture 100 is shown. The virtual switch architecture 100 may generally provide an EEPROM driver 120 for a distributed virtual switch environment. The EEPROM driver 120 may be simulated so the virtual switch may access driver functions without needing to modify an existing network operating system code.

The virtual switch architecture 100 may include a memory module 110 and a processor 140. In an exemplary embodiment, the processor 140 may be configured to coordinate read/write activity from an in-memory data structure. A small section of software code, for example a write function call, takes the in-memory data structure that is normally written directly to a physical EEPROM by a EEPROM driver, and instead the processor 140 may write it to the a shared memory area or device in the memory module 110. In an exemplary embodiment, the write function may be written in Linux code and the shared memory area may be a Linux shared memory device file, for example (/dev/shm/xxxx) where xxxx is a unique name chosen by a developer. This write function may be designated as a virtual EEPROM driver 120 when written to the memory module 110. The virtual EEPROM driver 120 may provide the same driver functionality as a physical EEPROM driver by writing the in-memory object in data form to shared memory.

The memory module 110 including the shared memory though may be volatile, so when the system employing the virtual switch reboots, contents, such as the write function may be lost. In an exemplary embodiment, to achieve a non-volatile state of EEPROM, the processor 140 may duplicate the virtual EEPROM driver 120 from shared memory to a common data storage location 130. The common data storage location 130 may be a shared data storage location that can be accessed by any network/switch operating system that may be running a virtual switch. In an exemplary embodiment of the present invention, the common data storage area 130 may be used to write to the EEPROM, so if a user saves the EEPROM with image1, and reboots, the EEPROM data which is common for the switch is available to image2 if image2 is booted next time. Thus the EEPROM data may be made available to the system. The common data storage location 130 may be a non-volatile memory location such as /flash. During boot up, a virtual switch employing the virtual switch architecture 100 may restore shared memory from the /flash location, thus achieving EEPROM non-volatility from a volatile shared memory solution.

Figure 2:
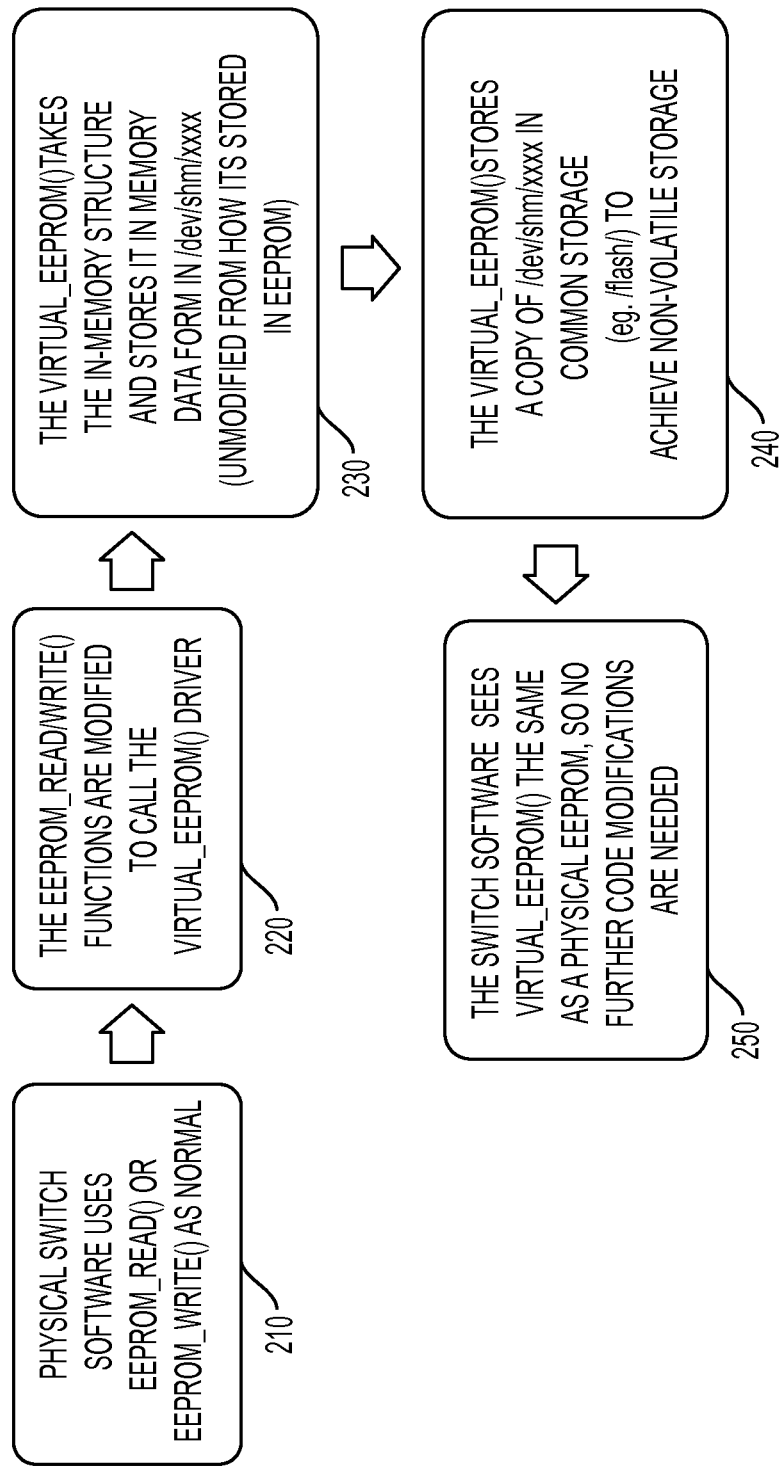
FIG. 2 is a flowchart of a process of simulating an EEPROM driver in a virtual switch in accordance with another exemplary embodiment of the present invention.

Referring now to FIG. 2, a process 200 of simulating an EEPROM driver in a virtual switch is shown. Software for a physical switch may perform 210 read/write functions for an EEPROM. The processor 140 may modify 220 the EEPROM read/write functions for use in a virtual EEPROM driver 120. The processor 140 may store 230 the EEPPROM write functions as the virtual EEPROM driver 120 in shared memory. The processor 140 may duplicate 240 a copy of the virtual EEPROM driver 120 into a non-volatile storage for example, the common data storage 130. The virtual switch recognizes 250 the virtual EEPROM driver 120 as a physical EEPROM device.

Figure 3:
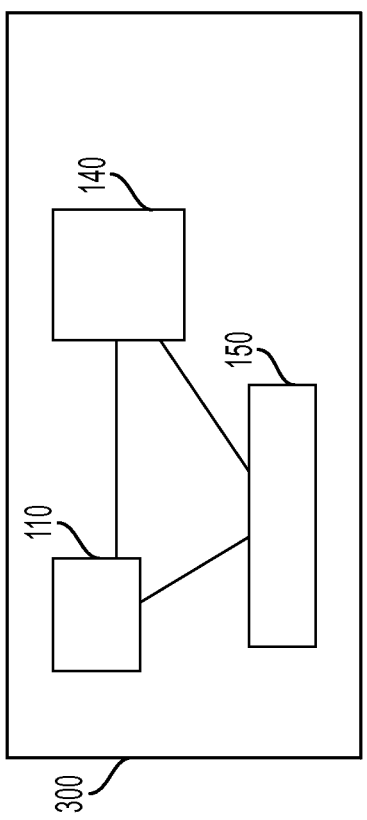
FIG. 3 is a block diagram of an exemplary host machine employing the virtual switch architecture of FIG. 1 in accordance with yet another exemplary embodiment of the present invention.

Referring now to FIG. 3, a host machine 300 employing the virtual switch architecture 100 is shown. The host machine 300 may be a computer, a server, or a switch. The host machine 300 may include the memory module 110, the processor 140, and a data storage device 150 all in connection to one another. The data storage device 150 may be a non-volatile storage device, for example a hard drive. The memory module 110 and processor 140 may perform their respective responsibilities as described with respect to FIGS. 1 and 2 in addition to functions as understood by one of ordinary skill in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A host machine, comprising:
    data storage;
    a memory module connected to the data storage; and
    a processor connected to the memory and the data storage, wherein the processor is configured to:
        read an EEPROM write function from an in-memory data structure,
        write the EEPROM write function to a shared memory area in the memory module, and
        designate the EEPROM write function as a virtual EEPROM driver.

2. The host machine of claim 1, including a non-volatile, common storage area in the data storage, wherein the processor is configured to duplicate the EEPROM write function to the common storage area.

3. The host machine of claim 1, wherein the EEPROM write function is written in Linux code.

4. The host machine of claim 2, wherein the duplicated EEPROM write function is written to a "/flash" location in the common storage area.

5. A computer program product for simulating an EEPROM in a virtual switch, the computer program product comprising a computer readable storage medium having computer readable program code embodied therewith, the computer readable program code being configured to:
    read an in-memory data structure;
    write an EEPROM write function to a shared memory device file in a memory module; and
    designate the written EEPROM write function as a virtual EEPROM driver in the memory module.

6. The computer program product of claim 5, the computer readable program code being configured to duplicate the written EEPROM write function to a non-volatile memory.

7. The computer program product of claim 5, wherein the shared memory device file is a Linux shared memory file.

* * * * *